United States Patent

[11] 3,619,382

[72] Inventor John H. Lupinski
 Scotia, N.Y.
[21] Appl. No. 6,196
[22] Filed Jan. 27, 1970
[45] Patented Nov. 9, 1971
[73] Assignee General Electric Company

[54] PROCESS OF REDUCING METAL COMPOUNDS TO METAL IN A MATRIX
 10 Claims, 3 Drawing Figs.
[52] U.S. Cl. .................................................. 204/30,
 204/15, 204/38 B, 204/224
[51] Int. Cl. ...................................................... C23b 5/64,
 C23f 17/00
[50] Field of Search........................................... 204/23, 15,
 130, 38 B, 38 R, 30, 224, 115; 117/47

[56] References Cited
UNITED STATES PATENTS 3,551,304 12/1970 Letter et al. .................. 204/30
3,408,785 9/1969 Polichette .................... 204/224

Primary Examiner—John H. Mack
Assistant Examiner—R. L. Andrews
Attorneys—James W. Underwood, Paul A. Frank, Richard R. Brainard, Joseph T. Cohen, Frank L. Neuhauser, Oscar B. Waddell and Joseph B. Forman ABSTRACT: An improved process is described for electrochemically reducing specified metal oxides, and/or hydroxides, including hydrated metal oxides, in an elastomeric matrix to metal to provide an electrically conductive surface which can be metal plated. The matrix can be the entire composition or it can be a surface coating on a nonconductive substrate. The process is especially suitable for producing a multiplicity of conductive surfaces separated from each other by a nonconductive surface.

Inventor:
John M. Lupinski,
by [signature]
His Agent

PROCESS OF REDUCING METAL COMPOUNDS TO METAL IN A MATRIX

PROCESS OF REDUCING METAL COMPOUNDS TO METAL IN A MATRIX

This invention relates to a process of reducing a metal compound in an elastomeric matrix to metal. More particularly, this invention relates to a process of reducing the oxides and/or hydroxides, including those hydroxides which are generally considered as being hydrated oxides, of cadmium, indium, lead (II) and zinc in an elastomeric matrix to metal at least on a portion of the surface of the matrix.

In my copending U.S. Pat. application Ser. No. 86,029 filed Nov. 2, 1970 as a division of my then copending but since abandoned application Ser. No. 800,823 filed Feb. 10, 1969 as a continuation-in-part of my now abandoned but then copending application, Ser. No. 710,071 filed Mar. 4, 1968 all of which are assigned to the same assignee as the present invention, I have disclosed and claimed compositions comprising a binder consisting essentially of an elastomer, having dispersed therein at least one oxide or hydroxide, including the so-called hydrated oxides, of cadmium, indium, lead (II) and zinc. As solids, these compositions can be used as molding compositions to produce shaped articles or they can be used as liquid dispersions to produce surface coatings on other substrates. The metal compound contained in these compositions to produce shaped articles or they can be used as liquid dispersions to produce surface coatings on other substrates. The metal compound contained in these compositions can thereafter be electrochemically reduced to metal at least on the surface of the objects and the reduction can be carried out so that only certain areas of the surface are reduced.

To effect reduction, the object is made the cathode in a neutral to alkaline aqueous electrolyte having an inert or nonconsumable anode and the system is electrically energized. Under these conditions, reduction of the metal compound in the elastomeric matrix starts at the point where electrical contact is made with the metal compound containing object and then spreads over the metal compound containing surface with reduction also occurring to a measurable depth below the surface. Although this means of reduction is satisfactory in reducing the metal compound to free metal in the surface of the objects so that they can be electroplated in those areas so reduced, the process is rather time consuming especially if the area to be reduced is quite extensive or is a convoluted design on a surface. Some reduction in time can be accomplished by using multiple contacts but the lead below the electrolyte must be insulated and even this is somewhat inefficient and quite often requires the moving of the contacts to complete the reduction over the entire area. Since those areas where reduction first occurs are now electrically conductive, some current efficiency is lost due to electrolysis of water and also reduction of the metal compound to metal occurs to a greater depth in the area where reduction first occurs unless the composition is a surface coating of limited thickness and reduction is continued long enough to convert all of the metal compound in the surface coating to metal. When the coating compositions are used to produce a multiplicity of separated coated areas, for example, the multiple circuits of a printed circuit board, individual letters in a printed text, etc., electrical contact has to be made to each individual isolated coated area. If the number of such areas is quite extensive, it is not economically feasible to use electrochemical reduction. For such applications, chemical reduction methods have to be used. However, chemical reduction is much less desirable than electrochemical reduction since it occurs much more slowly, is more expensive, and, generally, does not reduce the metal compound in the elastomeric matrix to metal to as great a depth. The reduction of metal below the surface is desirable since any metal thereafter plated onto such a surface is much more adherent.

It is an object of my invention to provide a process for more rapidly reducing the metal compound in such composition to metal.

It is another object of this invention to provide a process for effecting such reductions regardless of whether the areas where the metal compound is to be reduced is one continuous area or a multiplicity of unconnected or separated areas.

It is still another object of my invention to provide a process which can be used on irregular shaped surfaces, extensively long surfaces or difficulty reduceable surfaces, for example, the internal surface of a tube.

These and other objects and the advantages of this invention will become apparent from the following description, taken in connection with the drawing, in which.

Figure 1:
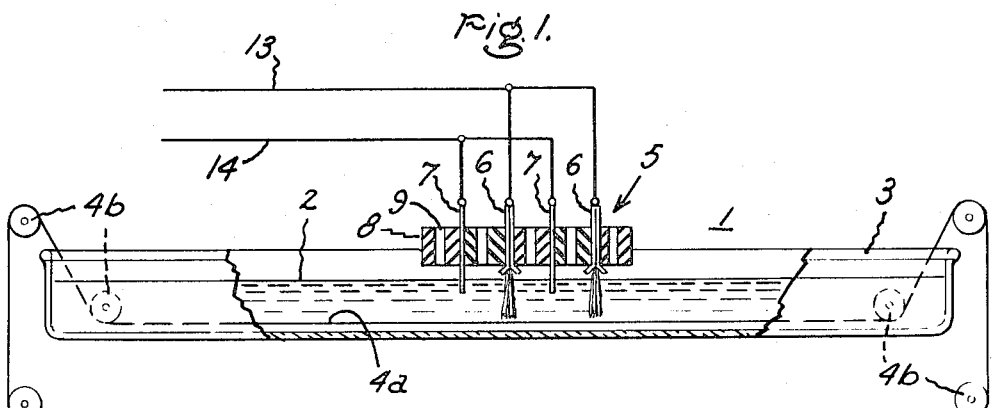
FIG. 1 is a side view, partly in cross section, of one embodiment of an apparatus which can be used in practicing the process of this invention.

I have now discovered that the reduction of the metal compounds in the elastomeric matrix to metal by electrochemical means can be readily accomplished in relatively short times regardless of whether the areas where reduction is to be accomplished is one continuous area or a series of disconnected and isolated areas. This is accomplished by using an electrode assembly comprising at least one nonconsumable anode and at least one nonconsumable brush cathode and providing relative motion between the metal compound containing matrix surface and the electrically energized electrode assembly in a neutral or alkaline aqueous electrolyte in such a spaced relationship as to progressively bring the cathode but not the anode into physical contact with the total area of the surface where it is desired to reduce the metal compound to metal.

As previously mentioned, the compositions that I can use either in the form of shaped objects or as surface coatings on a supporting substrate are disclosed and claimed in my copending application. Ser. No. 800,823, now abandoned, which is hereby incorporated by reference for its teaching of not only the metal compounds and the various elastomers used as the matrix but also for various techniques of using these compositions in the making of electrically conductive surfaces which can be used per se or which can be electroplated or electroless plated with one or more metals to produce metal plated objects where the metal plating completely covers or forms decorative or utilitarian designs on the surface as is also disclosed and claimed in my above-discussed copending application, Ser. No. 86,029.

These applications teach that the oxides and/or hydroxides including those hydroxides which generally are considered hydrated oxides, of cadmium, indium, lead (II) and zinc can be incorporated into an elastomeric matrix. The matrix can be any of the various elastomers known in the art, for example the homopolymers of the various 1,3-butadienes and their copolymers, including graft, block and random copolymers, with other polymerizable monomers, polymeric urethane elastomers, silicone elastomers, chlorosulfonated polyolefin elastomers, etc. These elastomers are used in their thermoplastic form, i.e., they are still solvent-soluble and have not been cross-linked or vulcanized to their insoluble, infusible state. However, various dyes, pigments, tackifiers, vulcanizing agents, curing agents, etc., can be incorporated and the compositions vulcanized or cross-linked after molding or application as a coating. These various ingredients can be blended together by well-known compounding techniques to produce compounds which can be molded so that the entire structure comprises the metal compound filled elastomeric matrix or a solvent for the elastomer can be used to produce coating compositions which can be applied to the desired areas by dipping, spraying, brushing, silk-screening, etc. The entire surface or only a part of the surface can be coated to form a design, for example, printed text, electrical circuits etc.

As will be obvious to those skilled in the art, the amounts of elastomer and metal compound in the final objects made from either the solid or liquid dispersions should be within practical limits. If too much metal compound is present, then the amount of elastomer will not be sufficient to bind the particles of the metal compound together into a cohesive mass nor form a cohesive film or coating on a substrate. The maximum amount of metal compound that can be incorporated is not readily expressed as a percentage since it is dependent on the particle size, nature of the binder, etc. As a general guideline, but not as a strict limitation, the metal compound generally should not exceed 60 percent by volume of the total volume of the solids content of the composition to obtain best results. However, the critical limit is determined by the amount of elastomer required to provide cohesive film-forming properties to the composition, i.e., the solid dispersion can be formed into a coherent sheet or film and the liquid dispersion can be formed by casting, spraying, painting, etc., into a coherent film or coating.

It is also apparent that the electrical conductivity after reduction of the metal compound to metal will be adversely affected if the amount of metal compound is too low, i.e., the amount of elastomer is so high that the individual metal particles are completely encapsulated in the elastomeric matrix. The minimum requirement for the amount of metal compound dispersed in the elastomer is best expressed as the amount sufficient that a film made from a composition can be electrochemically reduced to metal. The percentage required varies again on the size of the particles, the nature of the binder, the degree of dispersion, the thickness of the coating, etc. As a general guideline, but not as a strict limitation, the amount of metal compound should beat least 20 percent by volume of the solids in the composition when another conductive solid, e.g., conductive carbon, semiconductive copper oxide, molybdenum dioxide, etc., is also present, and at least 25 percent by volume when another conductive solid is absent from the composition. As a general rule, when the metal compound is present in less than these amounts, reduction or plating proceeds at such a slow rate that any savings in metal compound is dissipated in the cost of longer process time and, if electrochemical means are used, power inefficiency. Where the highest conductivity is desired in the reduced metal containing film and the optimum properties are desired in the plated metal film, the metal compound should be present in amounts of 30 to 50 percent by volume and the elastomer in amounts of between 70 to 50 percent by volume.

Although the surfaces of the elastomeric matrix containing the metal compound can be plated with a metal either by electroplating or electroless plating procedures, it is highly desirable to first reduce the metal compound to metal at least on the surface of the coating by cathodic treatment with an electrolyte. Such metal containing coatings are catalytically active for the electroless plating reaction, thereby eliminating the surface activation steps, and generally, the metal containing surfaces are highly conductive so that they may be readily electroplated. When plated by either technique, metal deposition occurs immediately over the entire coated surface which has been so reduced.

Reduction of the metal compound to metal throughout a thin film or coating occurs without interfering with adhesion between the particles and the elastomeric matrix. The reduction into the layer occurs at a slower rate than the reduction on the surface. Therefore, when thick coatings or films are reduced, surface reduction will be completed first, but not to the exclusion of some reduction into the coating. If desired, continuing the reduction reaction will produce free metal in at least the first 10 mils below the surface. For electroplating or electroless plating, only surface reduction is necessary, but the simultaneous reduction into the coating materially increases the adhesion of the metal plated layer.

As previously mentioned, the reduction starts at the point where electrical contact is made and spreads from this point over the balance of the metal compound containing surface which is continuous with that to which electrical contact has been made. Any metal compound containing surface which is not electrically connected does not become reduced. Therefore, all isolated areas where reduction is desired must be electrically connected to the cathode. My process eliminates the need to make manual contacts to each of the isolated areas as well as speeds up the reduction process for any particular area. The above aspects of the invention are illustrated in the drawings.

FIG. 1 illustrates one embodiment of an apparatus 1 for carrying out my invention. Apparatus 1 comprises electrolyte 2, container 3, electrode assembly 5 and means 4 for providing relative motion between the electrode assembly 5 and the object whose surface is to be reduced. The only requirements for electrolyte 2 are that it conducts electricity, generates hydrogen at the cathode (i.e., is free of metal ions which would electrodeposit at the anode) and does not deleteriously affect or attack the objects or their surfaces to be electrolytically reduced or the electrodes. Although any aqueous electrolyte which will produce hydrogen at the cathode is satisfactory for the reduction, the preferred electrolyte is an alkaline or neutral electrolyte, for example, an aqueous solution of an alkali metal hydroxide, carbonate, or bicarbonate, on an alkali metal salt of the mineral acid, preferably sulfuric acid. These solutions are cheap, readily available and also cause no harmful dissolution of the metal compound present in the elastomeric matrix during the cathodic treatment as can occur with an acidic electrolyte.

Electrolyte 2 is held in container 3 which can be of any suitable material not adversely affected by the electrolyte and is preferably an electrical insulator, for example glass, plastic, rubber, etc. or a metal lined with an electrical insulator for example a metal tank lined with a plastic or rubber coating.

As illustrated in FIG. 1, the means for providing relative motion between electrode assembly 5 and the object whose surface is to be electrochemically reduced is illustrated as being an endless belt 4a passing over rollers 4b at least one of which is motorized to drive endless belt 4a. Other means for providing relative motion between electrode assembly 5 and the object whose surface is to be electrochemically reduced will be readily apparent to those skilled in the art. For example the object can remain motionless and electrode assembly 5 moved, for example, on tracks, across the surface of the object whose surface is to be reduced, or the electrode assembly can be moved in one direction while the object whose surface is to be reduced can be moved in the opposite direction.

Figure 2:
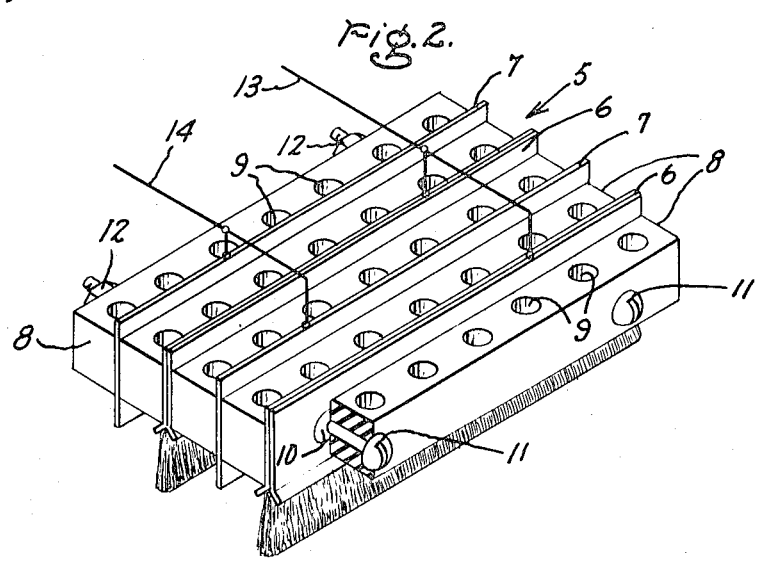
FIG. 2 is an isometric view, enlarged to show detail, of the electrode assembly of FIG. 1.
Figure 3:
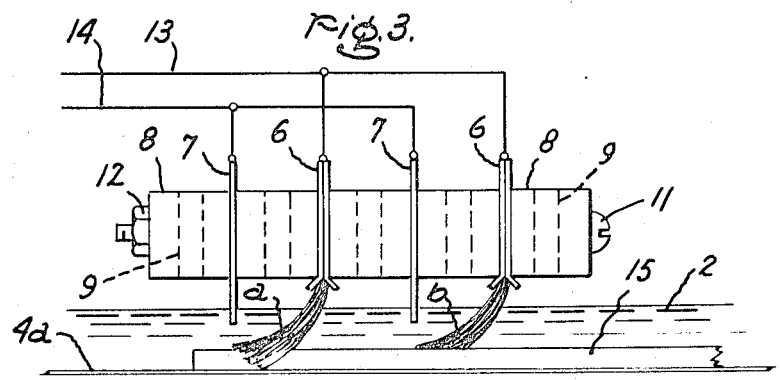
FIG. 3 is a cross-sectional view of a portion of the apparatus of FIG. 1, showing the electrode assembly making electrical contact with the metal compound containing matrix surface of an object during the reduction step.

One embodiment of electrode structure 5 which is shown in more detail in FIG. 2 and in its contacting relationship with the object to be reduced in FIG. 3, comprises at least one brush cathode 6 and at least one anode 7 which are spaced and insulated from each other by spacers 8 which preferably, are provided with vent holes 9 to permit the escape of gases generated by the electrolytic action. Generally, it is desirable that electrode structure 5 has a series of pairs of brush cathodes 6 and anodes 7. For a given speed of relative motion between electrode assembly 5 and the surface containing the metal compound to be reduced, the use of a multiplicity of pairs of anodes and cathodes effectively increases the contact time each spot to be reduced remains in contact with the brush cathode thereby increasing the rate of reduction of the metal compound to metal in the elastomeric matrix. Stated another way, two pairs of anodes and brush cathodes will effect as much reduction when the speed of relative motion of the electrode assembly and the matrix is twice that of a single pair. All of the brush cathodes 6 are joined to a common electrical lead 13 and all of the anodes 7 are joined to a common electrical lead 14. Lead 13 is joined to the negative terminal and lead 14 is joined to the positive terminal of a source of direct electrical current not shown. The voltage and current used to effect reduction is not critical, and varies depending on the conductivity of the electrolyte, area of the electrodes, desired speed of reduction, etc. They generally are adjusted to hold gassing at the electrodes to a minimum commensurate with a reasonable rate of reduction.

Although not necessary to effect reduction of the metal compound to metal in the matrix, it is highly desirable that each brush cathode be matched and paired with an anode as will be explained later. As illustrated in the drawing, each anode 7 and brush cathode 6 in a pair are insulated from each other and each pair is insulated from any adjacent pair by a spacer 8 made of any suitable electrical insulating material, for example, phenolic laminate, polystyrene, polyethylene, polypropylene, rubber, etc. Brush cathode 6, anodes 7 and spacers 8 are assembled and held together to form electrode structure 5 by any suitable means for example by means of bolts 11 and nuts 12 which may be of metal or of an electrical insulating material, for example nylon, poly(phenylene oxides), etc. When bolts 11 are constructed of metal, they must be insulated, for example by means of grommet 10 made of any suitable insulating material, for example those named above, so that bolts 11 do not make a electrical short between a cathode 6 and an anode 7. Any one bolt 11 can make contact with one or all cathodes 6 or one or all anodes 7 but not both.

As shown in FIG. 3, electrode assembly 5 and object 15, whose surface is to be electrically reduced, should be moved relative to each other in such a spaced relationship as to progressively bring the bristles of brush cathode, but not the anode in physical contact with the total area of the surface where it is desired to reduce the metal compound to metal. Anodes 7 of course will have to be partially immersed in electrolyte 2. In order to make good electrical contact to object 15, the bristles of brush cathodes 6 should be good electrical conductors, resilient and sufficiently long so that those bristle contacting the surface of object 15 will be bent towards, but not into contact with the adjacent anode. It is highly desirable that my process be applicable to objects 15 having irregularly shaped surfaces, for example, concave, convex, ribbed, dimpled, etc., surfaces. Therefore, the bristles of brush cathodes 6 should be sufficiently resilient or "springy" that they will always retain contact with all the desired areas of the surface of object 15 regardless of the changes in contour of the surface encountered during the period of relative motion, yet, the bristles should not be so stiff that they would deleteriously scratch the surface of object 15. Therefore, the bristles should be both supple and resilient, i.e., supplely resilient. These bristles for example can be soft but resilient, fine metal wires which are inert to the electrolyte or other conductive fibers. I have found that carbon fibers, especially those that have been graphitized, are ideally suited for the bristles of my brush cathodes since they are good conductors of electricity, supple, very resilient and are inert to the electrolyte thereby avoiding contamination.

When the electrode structure 5 is flat, as illustrated in the drawing, it preferably is at least as wide as object 15 so that only a single relative movement of electrode structure 5 over the surface of object 15 is required to contact the entire top surface by the bristles of brush cathodes 6. In FIG. 3 the position of the bristles as designated by B, shows them in contact with only the top surface of object 15, i.e., when the width of the electrode assembly 5 is no greater than the width of object 15. The position of the bristles as designated by a shows them when the electrode assembly is wider than object 15 and they not only contact the top surface but also the sides of object 15 which is desirable when the sides also contain the metal compound to be reduced.

As will be evident to those skilled in the art, both the materials of brush cathodes 6 and anodes 7 should be such that they do not introduce metal ions into the electrolyte 2 since such metal ions would contaminate the bath and especially would cause difficulties if they deposited at the cathode. They therefore are best made out of materials which are not consumed by the electrolytic process. Stainless steel is ideal for the anodes and the metal parts of the brush cathodes.

The position of the bristles of brush cathodes 6 in FIG. 3 illustrate their position when the relative motion is such that the anode assembly is being moved to the right or object 15 is being moved towards the left. It is evident that if the direction of relative motion was the exact opposite that the bristles b of the cathode on the right would be bent away from the adjacent anode with which it is paired whereas the bristles a of the cathode on the left would be bent towards this same anode and away from the anode with which it is paired. I have found that the effect of this would be that almost all of the electric current would flow only between the bristles a of the brush cathode on the left and anode on the right. Under such conditions, the electrode structure is functioning as though it had only one anode and one brush cathode pair.

As the number of pairs of brush cathodes and anodes in electrode assembly 5 is increased, this effect is diminished since only the end cathode and end anode of the electrode assembly are affected by the direction. However, even in the case where the effect is minimal, such an electrode assembly is no more effective than the same electrode assembly having one less pair of electrodes utilized so that the bristles of the brush cathode are bent towards the anode of its pair. I have also discovered that when the bristles are bent towards the adjacent anode, a further beneficial effect is obtained since the highest current density is at the tips of the bristles so that higher efficiency in utilization of the electrical current in causing the desired electrolytic reduction of the metal compound to metal in the matrix is obtained. To obtain full benefit of this effect it is preferable to have only the bristles of the brush cathode contact the electrolyte and also to have the shape and size of the anode such that the tips of all of the bristles are moved nearer to the adjacent anode by being bent by their contact with object 15.

Although the drawing has illustrated the electrode assembly as being a flat structure, it will be readily apparent to those skilled in the art that the electrode structure can be any desired shape to accommodate any one of a wide variety of surface of irregularly shaped objects. For example, the electrode assembly can be in the form of a cylinder whose longitudinal segments are the elements of the described electrode structure. The bristles of the brush cathodes and the electrolyte contacting surface of the anode would be on the outside wall of the cylinder when it is desired to reduce the metal compound on the inside surface of a cylinder or tube and on the inside when it is desired to reduce the metal compound on the outside surface of a cylinder. In both these cases, the direction of relative motion would be circular around the common axis. When it is desired to have the relative motion along the axis of the tube, the segments of the elements of the electrode assembly can be circular or ring shaped for internal surfaces and ring shaped for external surfaces of a cylindrical object. Curved shapes to permit reduction of the metal compound on the surfaces of small objects in a tumbling barrel are readily made. Other shapes for the electrode assembly will be readily apparent to those skilled in the art. In many of these applications the electrodes should be insulated in a way that permits complete immersion of the electrode assembly with only the desired areas of the electrode being in electrical contact with the electrolyte, e.g., the bristles of the brush cathode and part of the anode. In addition to shaping the actual electrode assembly, the bristles of the brush cathode can likewise be trimmed or even omitted in certain portions along the length of the cathode to meet certain requirements necessitated by the shape of object 15 or the design on the surface of object 15.

These and other embodiments of my invention will be readily apparent to those skilled in the art from the above description and the following specific examples.

In order that those skilled in the art may better understand my invention the following examples are given by way of illustration and not by way of limitation.

The apparatus used was essentially that shown in the drawing except that in place of the motorized endless belt, a frame cut from a sheet of polyethylene, attached by a thin flexible stainless wire to a motorized reel was used to move the test pieces at a uniform rate beneath the electrode assembly in a right to left direction. The electrolyte was a 10 percent aqueous solution of potassium hydroxide contained in a chemically resistant glass dish. The anodes 7 were sheets of stainless steel, the brush cathodes 6 were parallel, graphitized carbon fibers sandwiched on one end between two stainless steel sheets which were spot-welded together to produce each brush cathode. Insulating spacers 8 were polyethylene. The electrode structure consisted of two anodes and two brush cathodes and the entire structure was clamped together with two C clamps which permitted easy means of suspending the electrode structure at the desired height in the electrolyte system so that the stainless steel portion of the cathode did not contact the electrolyte and yet the carbon fibers would be bent and make good contact with the test piece as it passed beneath the electrode assembly.

EXAMPLE 1

A coating solution was made by dissolving 10 g. of a polymer of 2-chloro-1,3-butadiene (Neoprene AD-10) in 17.5 g. of toluene, 7.5 g. of monochlorobenzene, 43.5 g. xylene and 23 g. of n-heptane in which 42 g. of zinc oxide was dispersed by ball-milling. Test plaques, 1⅞ inch × 2½ inch × ⅛ inch molded from a blend of poly(2,6-dimethyl-1,4-phenylene oxide) and polystyrene, were coated on one side with this composition and the solvent permitted to evaporate. For comparison purposes, the zinc oxide on the surface of one plaque was electrochemically reduced by making electrical contact with a metal strip along the entire length of one of the 1⅞-inch edges and using it as the cathode in a 10 percent aqueous potassium hydroxide solution having a stainless steel sheet anode. Using a voltage of 3 volts it took 32 minutes before the white zinc oxide surface became a uniform gray color indicating substantially complete reduction of the zinc oxide to metal. When the brush cathode apparatus described above was used, complete reduction to a uniform gray color was obtained at a potential of 3 volts with a time of travel of 7 minutes under the brush cathodes. Use of more than two pairs of electrodes would have resulted in still faster times. The resistance of both samples measured over the long dimension of the sample was less than 2 ohms, showing that both surfaces were very conductive. The surfaces were readily copper-plated from a standard alkaline cyanide copper plating bath. Additional test plaques were also reduced and were readily plated with commercially available electroless copper plating solutions and electroless nickel plating solutions. Likewise a surface coating containing cadmium oxide in place of zinc oxide was readily reduced by this procedure to a conductive cadmium metal containing surface.

EXAMPLE 2

A transparent test plaque of polymethylmethacrylate was coated on one surface with a 0.8-mil thick coating of the above-described zinc oxide paint. Using the above-described brush cathode apparatus, the zinc oxide in the coating was reduced to zinc using a potential of 3.5 volts. The time of travel under the rush cathodes was 4 minutes. After three such passes, observation from the back side through the transparent plaque showed that the entire coating now had a uniform gray color and that therefore essentially all of the zinc oxide in the entire coating had been effectively reduced to zinc metal.

EXAMPLE 3

Two test plaques prepared as described in example 1 were used in this test. Using only a single anode and brush cathode pair and with the electrical current turned off, one test plaque was placed under the electrode assembly so that the bristles of the cathode were bent towards the anode. The other sample was placed under the electrode assembly so that the bristles of the cathode were bent away from the anode. Without moving either the electrodes assembly or the test plaques, the electrode assembly was energized for 7 minutes using a potential of 2.5 volts. The test plaques were removed and well washed with water dried. The test plaque which was in contact with the bristles which were bent away from the anode was only a uniform gray in that area in direct contact with the bristles showing that complete reduction had occurred only where direct contact had been made with the bristles. Some reduction had occurred for a short distance on either side of this area as evidenced by some gray color having developed in the white surface. In marked contrast, the test plaque which had been inserted so that the bristles were bent towards the anode showed a uniform gray area of complete reduction which was over twice the area of direct contact with the bristles. The additional area of reduction occurred in the area of under the curvature of the bristles. Again, some reduction had occurred on both sides of the area of complete reduction. The results of this test clearly demonstrate the decided advantage to be gained by having the bristles bent towards the anode during the reduction.

EXAMPLE 4

Some of the solvent was permitted to evaporate from the coating composition described in example 1 in order to produce a composition thick enough to use in a silk-screening process. This composition was used to silk screen various designs including printing having letters 1/16 inch high, convoluted lines, etc. onto various insulating substrates including both molded objects made from a blend of poly(2,6-dimethyl-1,4-phenylene oxide) and polystyrene and thin flexible film made from poly(ethyleneterphthalate). The latter was used as its own transport means for moving the printed design under the brush electrode assembly. After reduction with the brush electrode apparatus as described above, the designs were readily copper plated without further processing except washing with water and placing in an electroless copper plating solution. The zinc metal in the surface of the design caused the copper to plate from the solution onto only the surface containing the zinc metal without activation. Extremely accurate reproduction including punctuation marks in the printed text, fine lines in the lettering and the convoluted path in the design was realized.

In like manner, the various other compositions described in my above-identified copending application using other metal compounds, for example cadmium hydroxide, indium oxide, lead (II) (litharge), zinc hydroxide, etc. can be used in place of the zinc oxide. Likewise, the elastomer can be any of the elastomers disclosed in the above-identified copending application, for example the butadiene-styrene elastomers, butadiene-acrylonitrile elastomers, polyurethane elastomers, silicone elastomers, etc. Where my coating compositions are used to provide a surface coating on an insulating substrate, the particular substrate is not critical. It can be glass, ceramic, any of the various paper, cloth, glass fiber, etc. resin bonded laminates, thermoplastic and thermosetting molded objects, etc. All can be coated by my coating compositions and the metal compounds contained therein, thereafter reduced by my above-described process.

The procedures of the above examples are not limited to the exact details given therein. The choice of solvents for the coating compositions should give proper consideration to the known solvent resistance of the particular substrate chosen and the solubility characteristics of the particular elastomer chosen. A wide variety of metals other than copper can be plated either as the first metal to be plated or as an additional plate on top of a prior metal plate. Likewise, a wide variety of modifications can be made in the actual brush electrode reduction apparatus in addition to those shown and described. For example, the electrode structure can be the shape of an arc matching the internal curvature and used inside of a rotating barrel in which small objects whose surface is the metal compound containing elastomeric matrix described above, so that rotation of the barrel will tumble the parts in contact with the brush electrodes to cause reduction of the metal compound to metal on the surface of the objects, which can have a wide variety of different and irregular shapes. These and other modifications of this invention, which will be readily discerned by those skilled in the art, can be employed within the scope of the invention. The invention is intended to include all such modifications and variations as may be embraced within the following claims.

What I claim as new and desire to secure by Letters Patent of the United States is:

1. The process of reducing a metal compound selected from the group consisting of the oxides and hydroxides of cadmium, indium, lead (II) and zinc to metal while such metal compound is dispersed and bound in a cohesive, elastomeric matrix in an amount sufficient that it can be electrochemically reduced to metal, which comprises providing relative motion between the matrix and an electrically energized electrode assembly in a neutral to alkaline aqueous electrolyte in such a spaced relationship as to progressively bring the cathode but not the anode into physical contact with the total area of the surface where it is desired to reduce said metal compounds to metal, for a time sufficient to effect such reduction, said electrode assembly comprising at least one nonconsumable anode and at least one nonconsumable brush cathode whose electrically conductive bristles are supplely resilient and sufficiently long that those bristles which contact the surface during the period of the relative motion are bent towards, but not into contact with the adjacent anode during the period of such contact with the matrix.

2. The process of claim 1 wherein the metal of the metal compound is zinc.

3. The process of claim 1 wherein the metal compound is zinc oxide.

4. The process of claim 1 wherein the elastomeric matrix is a polymer of 3-chloro-1,3-butadiene.

5. The process of claim 1 wherein the elastomeric matrix is a polyurethane elastomer.

6. The process of claim 1 wherein the electrolyte is an aqueous solution of an alkali metal hydroxide.

7. The process of claim 1 wherein the elastomeric matrix is a coating on a nonconductive substrate.

8. The process of claim 1 wherein the bristles of the brush cathode are carbon fibers.

9. The process of claim 1 wherein the elastomeric matrix is a patterned surface on a nonconductive substrate.

10. The process of claim 9 wherein the pattern surface comprises a series of disconnected areas.

* * * * *